United States Patent
Nakayama

(10) Patent No.: US 10,012,128 B2
(45) Date of Patent: Jul. 3, 2018

(54) ENGINE AND OUTBOARD MOTOR

(71) Applicant: YAMAHA HATSUDOKI KABUSHIKI KAISHA, Iwata-shi, Shizuoka (JP)

(72) Inventor: Koichi Nakayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 128 days.

(21) Appl. No.: 15/063,616

(22) Filed: Mar. 8, 2016

(65) Prior Publication Data

US 2016/0273439 A1 Sep. 22, 2016

(30) Foreign Application Priority Data

Mar. 17, 2015 (JP) ................... 2015-053697

(51) Int. Cl.
*F01N 13/08* (2010.01)
*F01N 13/00* (2010.01)
*F01N 3/04* (2006.01)
*F01N 13/10* (2010.01)
*F01N 3/10* (2006.01)

(52) U.S. Cl.
CPC ........... *F01N 13/008* (2013.01); *F01N 3/043* (2013.01); *F01N 3/046* (2013.01); *F01N 13/004* (2013.01); *F01N 13/107* (2013.01); *F01N 3/10* (2013.01); *F01N 2260/024* (2013.01); *F01N 2590/021* (2013.01); *Y02T 10/20* (2013.01)

(58) Field of Classification Search
CPC ........ F01N 3/005; F01N 3/046; F01N 3/2892; F01N 13/008; F01N 13/085; F01N 13/12; F01N 2240/20; F01N 2560/02; F01N 2590/00–2590/022
See application file for complete search history.

(56) References Cited

U.S. PATENT DOCUMENTS

2008/0022671 A1* 1/2008 Konakawa ........... B63H 20/245
60/313
2014/0322997 A1 10/2014 Ochiai et al.

FOREIGN PATENT DOCUMENTS

| JP | 2007321593 A | * | 12/2007 |
| JP | 2008051006 A | * | 3/2008 |
| JP | 2014009614 A | * | 1/2014 |

OTHER PUBLICATIONS

Machine translation of JP 2014009614 A, accessed Oct. 11, 2017.*

* cited by examiner

*Primary Examiner* — Jonathan Matthias
(74) *Attorney, Agent, or Firm* — Keating and Bennett, LLP

(57) ABSTRACT

An engine includes an exhaust sensor projecting from an opening in an inner surface of a first exhaust pipe to inside of an exhaust passage, and a projection provided in the inner surface of the first exhaust pipe along the opening, and positioned farther inside the exhaust passage than the opening, wherein at least a portion of the projection is positioned upstream of the opening in a flow direction of exhaust gases.

17 Claims, 11 Drawing Sheets

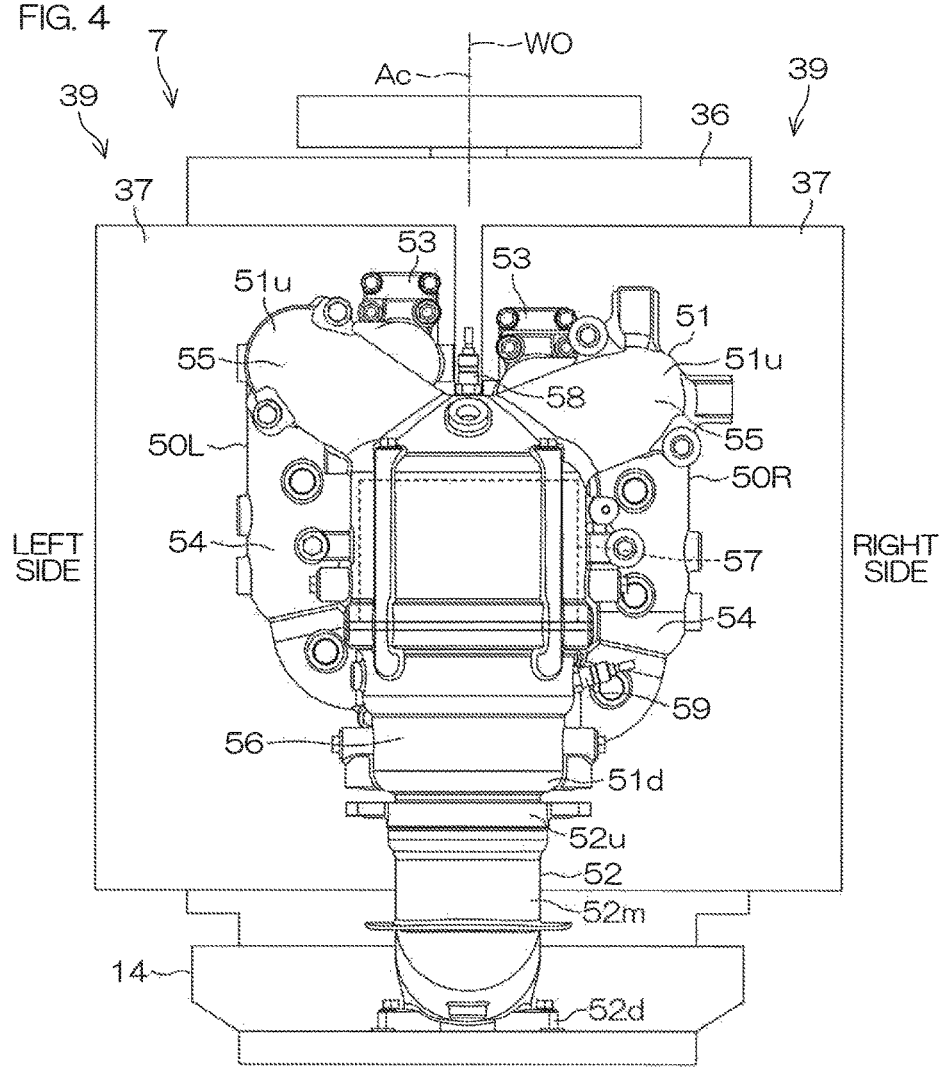

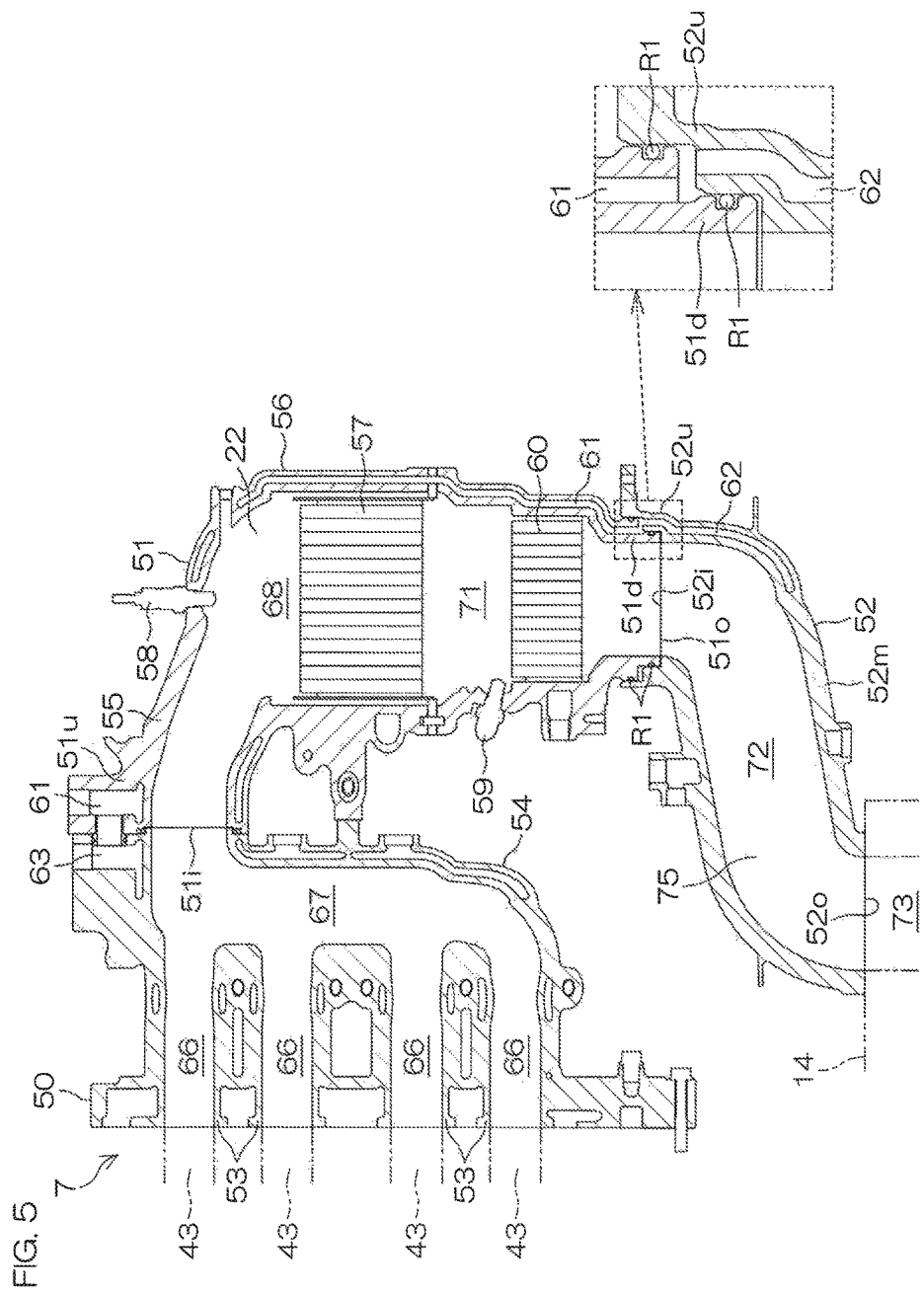

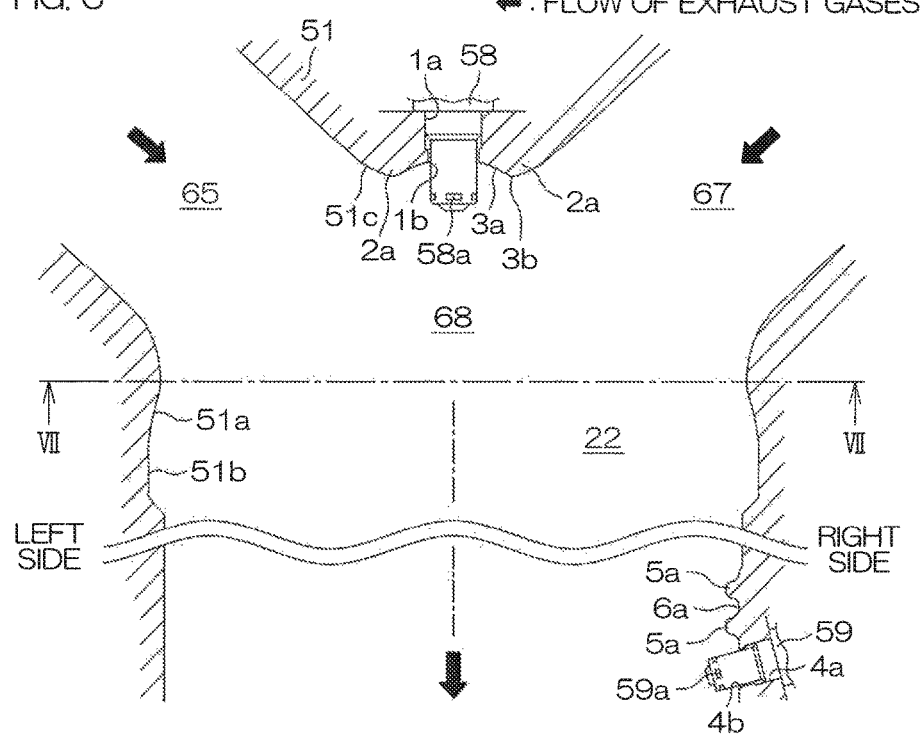
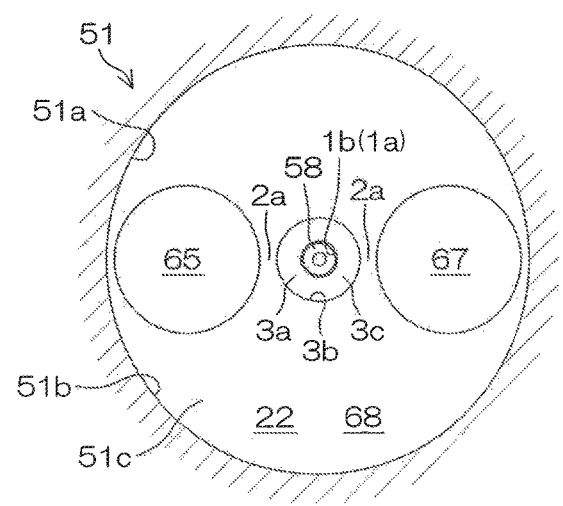

ENGINE AND OUTBOARD MOTOR

BACKGROUND OF THE INVENTION

1. Field of the Invention

The present invention relates to an engine including an exhaust sensor that detects a state of exhaust gases flowing in an exhaust passage, and an outboard motor including the engine.

2. Description of the Related Art

US 2014/0322997 A1 discloses an outboard motor powered by a V-type engine. This outboard motor is equipped with an in-bank exhaust system that discharges exhaust gases to the inside of two cylinder banks.

The engine includes an exhaust pipe that returns exhaust gases discharged from exhaust manifolds to the exhaust manifolds. Exhaust gases discharged from the two cylinder banks are collected in the exhaust pipe and purified by one catalyst disposed inside of the exhaust pipe. Two exhaust sensors are disposed upstream and downstream of the catalyst, respectively. A water jacket that guides cooling water is provided between an inner wall surface of the exhaust pipe that defines an exhaust passage and an outer wall surface of the exhaust pipe.

When an output of the engine is low (for example, during idling), a temperature of the inner wall surface of the exhaust passage may drop to a temperature equal to or lower than the dew point. In this case, moisture contained in the exhaust gases changes into liquid droplets on the inner wall surface due to condensation. This condensed water flows inside of the exhaust passage along the inner wall surface. When the condensed water comes into contact with the exhaust sensor, the exhaust sensor may malfunction.

Further, in an engine for an outboard motor, rather than a system that circulates cooling water, a system that takes water from outside a vessel into the inside is generally used so that cooling water having low temperature is reliably supplied. Therefore, as compared with an engine for a land vehicle, the temperature of the inner wall surface is low, and condensed water is easily generated.

SUMMARY OF THE INVENTION

In order to overcome the previously unrecognized and unsolved challenges described above, a preferred embodiment of the present invention provides an engine including a cylinder head defining a combustion chamber inside which an air-fuel mixture burns, an exhaust pipe defining an exhaust passage that discharges exhaust gases generated in the combustion chamber, a cooling water passage that guides cooling water to cool the exhaust pipe, an exhaust sensor projecting from an opening provided in an inner surface of the exhaust pipe to the inside of the exhaust passage, and a projection provided in the inner surface of the exhaust pipe along the opening in which the exhaust sensor is inserted, and positioned farther inside the exhaust passage than the opening, wherein at least a portion of the projection is positioned upstream of the opening in a flow direction of the exhaust gases.

With this arrangement, the inner surface of the exhaust pipe defines an exhaust passage that discharges exhaust gases generated in the combustion chamber. The exhaust sensor that detects a state of the engine, such as concentrations of elements and compounds in the exhaust gas and a temperature of the exhaust gas, projects from the opening provided in the inner surface of the exhaust pipe to the inside of the exhaust passage. Condensed water flows downstream along the inner surface of the exhaust pipe according to a flow of the exhaust gases. The projection projecting from the inner surface of the exhaust pipe is positioned upstream of the opening in which the exhaust sensor is inserted. Therefore, a flow of condensed water toward the exhaust sensor is blocked by the projection. Accordingly, the amount of condensed water that reaches the exhaust sensor is reduced.

A shortest distance between the opening and the projection is preferably smaller than a circumferential length of the rim of the opening. The shortest distance between the opening and the projection preferably is, for example, a shortest distance between the center of the opening and the centerline of the projection. The centerline of the projection refers to a line bisecting the width of the projection.

The projection cannot block a flow of condensed water toward the exhaust sensor between the opening and the projection. With this arrangement, the projection is positioned near the opening, so that the amount of condensed water to be generated between the opening and the projection is reduced. Accordingly, the amount of condensed water that reaches the exhaust sensor is reduced.

A tip end of the exhaust sensor is preferably positioned farther inside the exhaust passage (closer to a centerline of the exhaust passage) than the projection.

With this arrangement, the tip end of the exhaust sensor is not covered by the projection, so that a flow of exhaust gases toward the tip end of the exhaust sensor is hardly blocked by the projection. Therefore, while the exhaust sensor is prevented from getting wet, a state of exhaust gases flowing in the exhaust passage is reliably detected by the exhaust sensor.

Any portion of the opening is preferably positioned downstream of the projection.

With this arrangement, the projection is positioned upstream of all portions of the opening, so that a flow of condensed water toward the exhaust sensor is blocked over a wide range. Accordingly, the amount of condensed water that reaches the exhaust sensor is further reduced.

The projection is preferably integral and unitary with the inner surface of the exhaust pipe.

With this arrangement, since the projection is integral and unitary with the inner surface of the exhaust pipe, work to attach the projection to the inner surface of the exhaust pipe and work to fix the projection to the inner surface of the exhaust pipe are unnecessary. Therefore, the process of manufacturing the engine is simplified.

The engine preferably further includes a catalyst disposed in the exhaust passage. In this case, the exhaust sensor and the projection are each preferably provided only upstream of the catalyst or only downstream of the catalyst, or may be provided both upstream and downstream of the catalyst.

The tip end of the projection is preferably positioned lower than the opening, and a portion of the inner surface of the exhaust pipe from the tip end of the projection to the rim of the opening is preferably positioned at a height between the tip end of the projection and the opening at any position.

With this arrangement, the tip end of the projection is positioned lower than the opening. Condensed water generated on the inner surface of the exhaust pipe flows down along the inner surface of the exhaust pipe due to gravity. When a portion extending down toward the opening is present between the tip end of the projection and the rim of the opening, condensed water generated at this portion flows toward the exhaust sensor. Therefore, by positioning the portion from the tip end of the projection to the rim of the opening at a height between the tip end of the projection and the opening at any position, the amount of condensed water that flows toward the exhaust sensor is reduced.

The inner surface of the exhaust pipe preferably includes a downward-facing portion at which a plurality of passages that guide exhaust gases open, and the opening and the projection are preferably provided at the downward-facing portion.

With this arrangement, a plurality of passages that guide exhaust gases open at the downward-facing portion are directed downward. Condensed water generated in these passages flows toward the downward-facing portion due to gravity. Therefore, condensed water easily gathers at the downward-facing portion. Accordingly, by providing a projection around the exhaust sensor disposed in this environment, the exhaust sensor is effectively prevented from getting wet with condensed water.

At least a portion of the projection is preferably positioned higher than the opening and the exhaust sensor.

When the opening from which the exhaust sensor projects is provided in a vertical surface, condensed water flows toward the exhaust sensor due to gravity. With this arrangement, the projection is not only positioned upstream of the opening but also positioned higher than the opening. Therefore, the amount of condensed water that reaches the exhaust sensor is effectively reduced.

The projection (preferably, the centerline of the projection) preferably extends from an upstream position upstream of the opening to a downstream position that is farther downstream than the upstream position and to the sides of the opening.

With this arrangement, condensed water reaching the projection is guided downstream along the projection extending from the upstream position upstream of the opening to the downstream position farther downstream than the upstream position. Since the downstream position is positioned to the sides of the opening, the projection guides condensed water to a position laterally of than the opening. No portion of the opening is positioned downstream of the downstream position, so that condensed water flowing downstream from the downstream position hardly reaches the exhaust sensor. Therefore, the amount of condensed water that reaches the exhaust sensor is further reduced.

The downstream position is preferably farther downstream than an upstream end of the opening.

With this arrangement, the projection guides condensed water to a position (downstream position) to the sides of the opening and farther downstream than the upstream end of the opening. Therefore, even if condensed water flows in a direction inclined toward the exhaust sensor from the downstream position, the condensed water hardly reaches the exhaust sensor. Therefore, the amount of condensed water that reaches the exhaust sensor is further reduced.

An angle between two straight lines that connect the center of the opening and both ends of the projection (for example, both ends of the centerline of the projection) is preferably 60 degrees or more, and further preferably 120 degrees or more.

If the angle between the two straight lines is small, the exhaust sensor may not be sufficiently protected from condensed water by the projection. On the other hand, when the angle between the two straight lines is 60 degrees or more, the projection sufficiently protects the exhaust sensor from condensed water. In particular, when the angle between the two straight lines is 120 degrees or more, the projection protects the exhaust sensor over a wide range from the condensed water, and the amount of condensed water that reaches the exhaust sensor is significantly reduced.

The projection preferably includes a V-shaped or arc-shaped configuration that opens downward. When the projection has an arc-shaped configuration that opens downward, the projection preferably has an arc-shape concentric with the opening.

In a case where the projection has an annular shape surrounding the entire circumference of the opening, condensed water may accumulate at a lower portion of the projection. With this arrangement, in each of the cases where the projection has a V-shaped configuration and the projection has an arc-shaped configuration, the projection opens downward, so that accumulation of the condensed water is prevented. Further, the projection guides the condensed water obliquely downward and laterally. Therefore, condensed water is kept horizontally away from the opening and the exhaust sensor by the projection. Accordingly, the amount of condensed water that reaches the exhaust sensor is reduced.

Another preferred embodiment of the present invention provides an outboard motor including the engine according to any of the above-described preferred embodiments, and a water pump that feeds water outside of the outboard motor to the cooling water passage of the engine.

With this arrangement, low-temperature water around the outboard motor is fed to the cooling water passage of the engine by the water pump. Therefore, as compared with a land vehicle, condensed water is easily generated on the inner surface of the exhaust pipe. Therefore, by providing a projection around an opening from which the exhaust sensor projects, the exhaust sensor is effectively prevented from getting wet with condensed water.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a schematic view showing a back surface of the engine.

FIG. 5 is a sectional view showing a vertical section of a portion of an exhaust passage, taken along line V-V in FIG. 2.

FIG. 6 is a sectional view showing a vertical section of the exhaust passage defined by an inner surface of a first exhaust pipe.

FIG. 7 is a sectional view showing a horizontal section of the first exhaust pipe, taken along line VII-VII in FIG. 6.

DETAILED DESCRIPTION OF THE PREFERRED EMBODIMENTS

Figure 1:
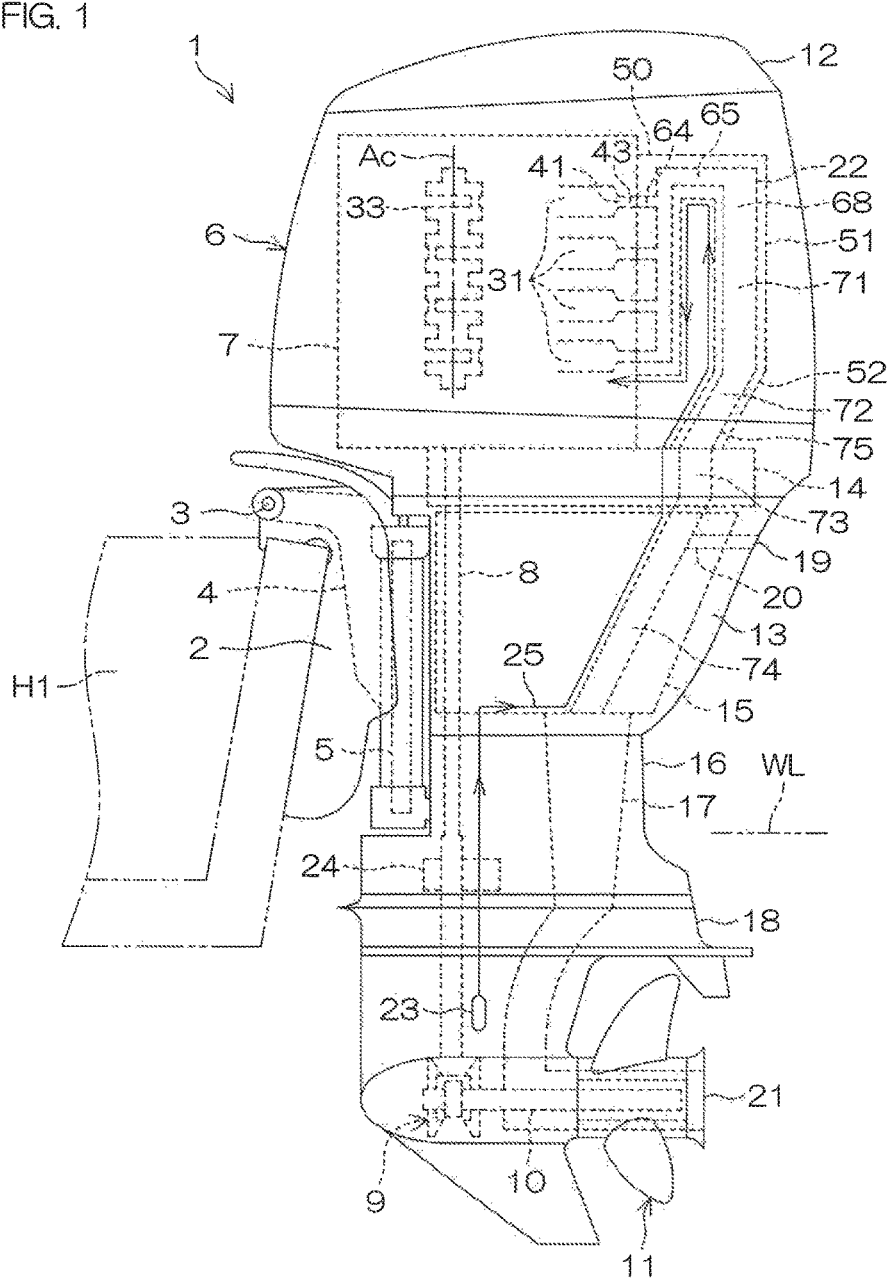
FIG. 1 is a schematic view showing a left side surface of an outboard motor according to a preferred embodiment of the present invention.

FIG. 1 is a schematic view showing a left side surface of an outboard motor 6 according to a preferred embodiment of the present invention.

A vessel propulsion apparatus 1 includes a clamp bracket 2 attachable to the rear portion (stern) of a hull H1, and an outboard motor 6 supported by the clamp bracket 2 via a tilting shaft 3, a swivel bracket 4, and a steering shaft 5. The outboard motor 6 is turnable with respect to the clamp bracket 2 around the centerline of the steering shaft 5 extending in the up-down direction, and turnable with respect to the clamp bracket 2 around the centerline of the tilting shaft 3 extending in the right-left direction.

The outboard motor 6 includes an engine 7 that is an example of an internal combustion that generates power to rotate a propeller 11, and a power transmission system that transmits the power of the engine 7 to the propeller 11. The power transmission system includes a drive shaft 8, a forward-reverse switching mechanism 9, and a propeller shaft 10. Rotation of the engine 7 is transmitted to the propeller shaft 10 via the drive shaft 8 and the forward-reverse switching mechanism 9. The direction of rotation to be transmitted from the drive shaft 8 to the propeller shaft 10 is switched by the forward-reverse switching mechanism 9. The propeller 11 rotates around the centerline of the propeller shaft 10 together with the propeller shaft 10.

The outboard motor 6 includes an engine cowling 12 covering the engine 7, and a casing 13 housing the power transmission system. The casing 13 includes an exhaust guide 14 disposed below the engine 7, an upper case 16 disposed below the exhaust guide 14, and a lower case 18 disposed below the upper case 16. The casing 13 further includes an oil pan 15 that stores lubrication oil to be supplied to movable portions such as the engine 7, and a tubular muffler 17 disposed inside of the upper case 16. The exhaust guide 14, serving as an engine support member, supports the engine 7 in a posture in which the rotation axis Ac of the crankshaft 33 extends in the up-down direction.

The outboard motor 6 includes an exhaust passage 22 that guides exhaust gases of the engine 7 to an exhaust opening 21 disposed below a waterline WL (a height of a water surface when a vessel equipped with the vessel propulsion apparatus 1 stops). The exhaust passage 22 extends from the engine 7 to the propeller 11. The exhaust passage 22 passes through the insides of the exhaust guide 14, the oil pan 15, the muffler 17, and the lower case 18 and is opened at a rear end portion of the propeller 11. The rear end portion of the propeller 11 defines the exhaust opening 21 that opens in water.

The outboard motor 6 further includes an idle exhaust passage 20 that guides exhaust gases of the engine 7 to an idle exhaust opening 19 disposed above the waterline WL. An upstream end of the idle exhaust passage 20 is connected to the exhaust passage 22 at a position lower than the engine 7. The idle exhaust passage 20 extends rearward from the exhaust passage 22 to the idle exhaust opening 19. The idle exhaust opening 19 is opened at an outer surface of the outboard motor 6. An opening area of the idle exhaust opening 19 is smaller than that of the exhaust opening 21.

Exhaust gases generated in the engine 7 are guided toward the exhaust opening 21 by the exhaust passage 22. When the output of the engine 7 is high, exhaust gases inside of the exhaust passage 22 are mainly discharged into water from the exhaust opening 21. Further, a portion of the exhaust gases inside of the exhaust passage 22 is guided to the idle exhaust opening 19 by the idle exhaust passage 20, and released to the atmosphere from the idle exhaust opening 19. On the other hand, when the output of the engine 7 is low (for example, during idling), the exhaust gas pressure inside of the exhaust passage 22 is low, so that the exhaust gases inside of the exhaust passage 22 are mainly released to the atmosphere through the idle exhaust opening 19.

The outboard motor 6 includes a water inlet 23 opened at an outer surface of the outboard motor 6, a water pump 24 that takes water as cooling water outside of the outboard motor 6 from the water inlet 23 into the inside of the outboard motor 6, and a cooling water passage 25 that guides water suctioned in the water inlet 23 to the respective portions of the outboard motor 6. The water pump 24 to be driven by the engine 7 is disposed in the cooling water passage 25 provided inside of the outboard motor 6. The cooling water passage 25 extends from the water inlet 23 to the exhaust passage 22, and extends from the exhaust passage 22 to the engine 7. Cooling water inside of the cooling water passage 25 cools members including the exhaust passage 22 and the oil pan 15, and then cools the engine 7. The cooling water supplied to the water jacket of the engine 7 is guided to the outside of the outboard motor 6 by the cooling water passage 25.

Figure 2:
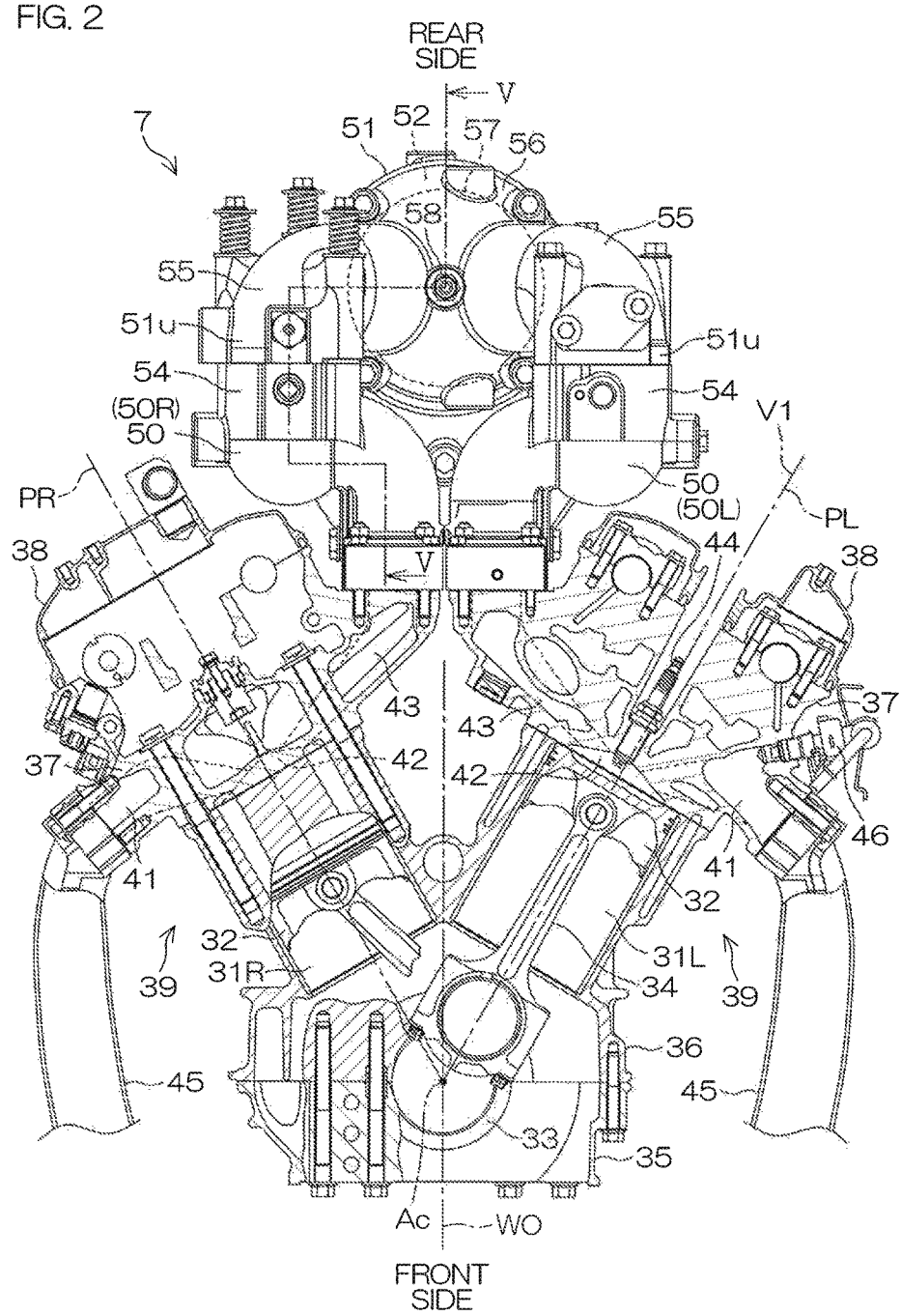
FIG. 2 is a partial sectional view showing a horizontal section of an engine.
Figure 3:
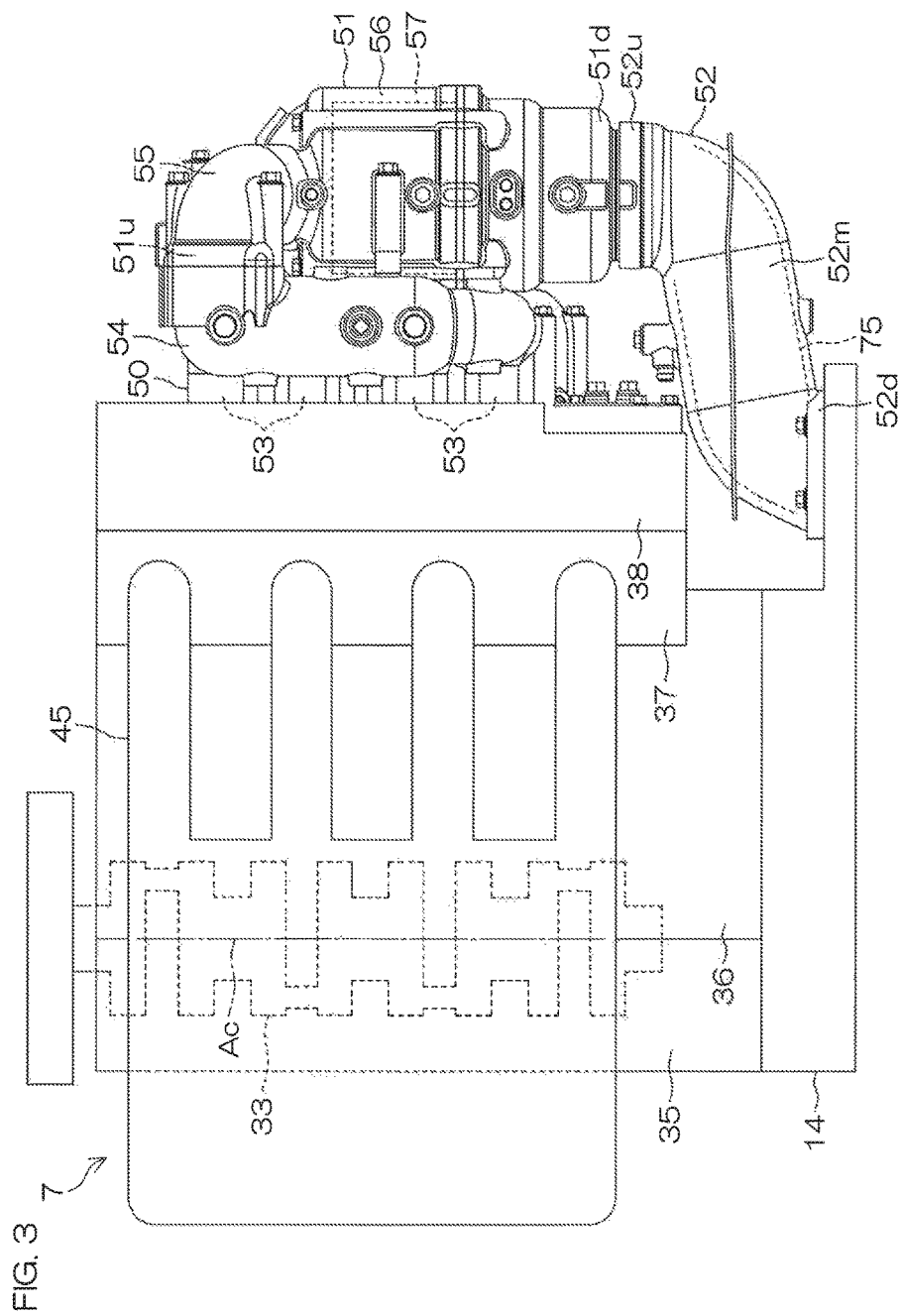
FIG. 3 is a schematic view showing a left side surface of the engine.

FIG. 2 is a partial sectional view showing a horizontal section of the engine 7. FIG. 3 is a schematic view showing a left side surface of the engine 7. FIG. 4 is a schematic view showing a back surface of the engine 7. FIG. 5 is a sectional view showing a vertical section of a portion of an exhaust passage 22, taken along line V-V in FIG. 2.

FIG. 2 shows a section that differs in height between the right side and the left side of a center WO (vertical surface that passes through the rotation axis Ac of the crankshaft 33 and is perpendicular or substantially perpendicular to the right-left direction) of the outboard motor 6. In FIG. 3 and FIG. 4, components other than the exhaust manifold 50, the first exhaust pipe 51, and the second exhaust pipe 52, etc., are omitted or simplified.

The engine 7 is preferably a V-type eight-cylinder four-cycle engine, for example. As shown in FIG. 2, the engine 7 includes a plurality of pistons 32 disposed inside a plurality of cylinders 31, respectively, a crankshaft 33 rotatable around a rotation axis Ac extending in the up-down direction, and a plurality of connecting rods 34 that join the plurality of pistons 32 to the crankshaft 33.

As shown in FIG. 2, the engine 7 includes two cylinder banks 39 provided with the plurality of cylinders 31, and a crankcase 35 attached to the respective cylinder banks 39. The two cylinder banks 39 include a cylinder body 36 having a V-shaped configuration that opens rearward in a plan view of the engine 7, two cylinder heads 37 attached to two rear end portions of the cylinder body 36, respectively, and two head covers 38 attached to the two cylinder heads 37, respectively.

The two cylinder banks 39 are disposed on the right side and the left side of the center WO of the outboard motor 6, respectively. The centerlines of the four cylinders 31 aligned in the right cylinder bank 39 are disposed in a first plane PR parallel or substantially parallel to the rotation axis Ac. The centerlines of the four cylinders 31 aligned in the left cylinder bank 39 are disposed in a second plane PL parallel or substantially parallel to the rotation axis Ac. The first plane PR and the second plane PL are symmetrical or substantially symmetrical about the center WO of the outboard motor 6, and are disposed in a V-shape manner in a plan view of the engine 7. A V-shaped line V1 is defined by the first plane PR and the second plane PL, and extends rearward from the rotation axis Ac.

Hereinafter, "first" and "R" may be associated with the beginning and the end of an "element corresponding to the right cylinder bank 39," respectively, and "second" and "L" may be associated with the beginning and the end of an "element corresponding to the left cylinder bank 39," respectively. For example, "cylinder 31 corresponding to the right cylinder bank 39" may be referred to as "first cylinder 31R," and "cylinder 31 corresponding to the left cylinder bank 39" may be referred to as "second cylinder 31L."

As shown in FIG. 2, the cylinder body 36 extends along the V-shaped line V1 in a plan view. The cylinder body 36 defines a plurality of cylinders 31 together with two cylinder heads 37. The two cylinder heads 37 are disposed behind the cylinder body 36, and the crankcase 35 is disposed in front of the cylinder body 36. The crankshaft 33 is disposed inside a housing space defined by the crankcase 35 and the cylinder body 36. As shown in FIG. 3, the crankcase 35 and the cylinder body 36 are disposed on the exhaust guide 14.

As shown in FIG. 2, the two cylinder heads 37 include a plurality of combustion chambers 42 corresponding to the plurality of cylinders 31, respectively, a plurality of intake ports 41 that supply air to the plurality of combustion chambers 42, and a plurality of exhaust ports 43 that discharge exhaust gases generated in the plurality of combustion chambers 42. The engine 7 includes a plurality of ignition plugs 44 that burn an air-fuel mixture in the plurality of combustion chambers 42, a plurality of intake valves that open and close the plurality of intake ports 41, a plurality of exhaust valves that open and close the plurality of exhaust ports 43, and a valve mechanism that moves the pluralities of intake valves and exhaust valves.

The region between the V-shaped line V1 in the right-left direction is the inside of the V-shaped line V1, and the right and left regions of the V-shaped line V1 are the outside of the V-shaped line V1. The intake ports 41 are disposed outside of the V-shaped line V1, and the exhaust ports 43 are disposed inside of the V-shaped line V1. The plurality of intake ports 41 are connected to the plurality of combustion chambers 42, respectively, and the plurality of exhaust ports 43 are connected to the plurality of combustion chambers 42, respectively.

An intake system of the engine 7 includes two intake manifolds 45 that supply air to the plurality of combustion chambers 42 via the plurality of intake ports 41. A fuel supply system of the engine 7 includes a fuel injector 46 that supplies fuel to the plurality of combustion chambers 42. An exhaust system of the engine 7 includes two exhaust manifolds 50 that discharge exhaust gases generated in the plurality of combustion chambers 42 from the plurality of combustion chambers 42 via the plurality of exhaust ports 43, and a first exhaust pipe 51 connected to the two exhaust manifolds 50. As shown in FIG. 3 and FIG. 4, the exhaust system of the engine 7 further includes a second exhaust pipe 52 connected to the first exhaust pipe 51.

As shown in FIG. 2, the intake manifolds 45 and the fuel injector 46 are disposed outside of the V-shaped line V1. The exhaust manifolds 50, the first exhaust pipe 51, and the second exhaust pipe 52 are disposed inside of the V-shaped line V1. The two exhaust manifolds 50 are disposed behind the two cylinder heads 37, respectively. The two exhaust manifolds 50 are members independent from each other, and are arranged side by side in the right-left direction. The first exhaust pipe 51 is disposed behind the two exhaust manifolds 50.

As shown in FIG. 3 and FIG. 4, the second exhaust pipe 52 is disposed below the first exhaust pipe 51. The second exhaust pipe 52 extends from the first exhaust pipe 51 to the exhaust guide 14. The exhaust manifolds 50 and the first exhaust pipe 51 are disposed higher than the exhaust guide 14. The second exhaust pipe 52 is separated from the engine main body including the cylinder heads 37 and the cylinder body 36.

The two exhaust manifolds 50 are fixed to the two cylinder heads 37 by, for example, a plurality of bolts, respectively. The two upstream end portions 51u of the first exhaust pipe 51 are joined to the two exhaust manifolds 50 by, for example, a plurality of bolts, respectively. The upstream end portion 52u of the second exhaust pipe 52 is joined to the downstream end portion 51d of the first exhaust pipe 51 via two O-rings R1 (refer to FIG. 5). The downstream end portion 52d of the second exhaust pipe 52 is fixed to the exhaust guide 14 by, for example, a plurality of bolts.

As shown in FIG. 5, each of the two exhaust manifolds 50 includes a plurality of upstream branch portions 53 connected to the plurality of exhaust ports 43, and an upstream collecting portion 54 connected to the respective upstream branch portions 53. As shown in FIG. 4, the first exhaust pipe 51 includes two downstream branch portions 55 connected to the two upstream collecting portions 54, respectively, and a downstream collecting portion 56 connected to the respective downstream branch portions 55. The second exhaust pipe 52 includes an upstream end portion 52u connected to the downstream collecting portion 56, and a downstream end portion 52d connected to the exhaust guide 14. As shown in FIG. 3, the second exhaust pipe 52 further includes a midstream portion 52m extending toward the crankshaft 33 from the upstream end portion 52u of the second exhaust pipe 52 to the downstream end portion 52d of the second exhaust pipe 52 in a side view.

As shown in FIG. 5, an inlet 51i of the first exhaust pipe 51 is disposed higher than an outlet 51o of the first exhaust pipe 51. The outlet 51o of the first exhaust pipe 51 is positioned below a catalyst 57. A diameter of the outlet 51o of the first exhaust pipe 51 is preferably larger than a diameter of the inlet 51i of the first exhaust pipe 51. A diameter of an inlet 52i of the second exhaust pipe 52 and a diameter of an outlet 52o of the second exhaust pipe 52 are preferably larger than the diameter of the inlet 51i of the first exhaust pipe 51. The inlet 52i of the second exhaust pipe 52 is disposed farther to the rear than the exhaust guide 14. The outlet 52o of the second exhaust pipe 52 is disposed above the exhaust guide 14.

The engine 7 includes the catalyst 57 disposed inside of the exhaust passage 22, an upstream sensor 58 that measures an exhaust gas concentration at a position farther upstream than the catalyst 57, and a downstream sensor 59 that measures an exhaust gas concentration at a position farther downstream than the catalyst 57. The engine 7 further includes a water-resistant member 60 disposed inside of the exhaust passage 22 at a position farther downstream than the downstream sensor 59. The catalyst 57, the upstream sensor 58, the downstream sensor 59, and the water-resistant member 60 are held by the first exhaust pipe 51.

The catalyst 57 is, for example, a three-way catalyst. The catalyst 57 is disposed in a catalyst housing portion provided in the downstream collecting portion 56 of the first exhaust pipe 51. The catalyst 57 is disposed inside a downstream collecting passage 68 of the exhaust passage 22 described below. An outer peripheral portion of the catalyst 57 surrounds the centerline of the exhaust passage 22, and is preferably concentric with the exhaust passage 22. The catalyst 57 includes a honeycomb carrier therein which exhaust gases pass through and a catalytic material on the surface of the carrier.

The catalyst 57 is disposed higher than the exhaust guide 14. The catalyst 57 is disposed at a height lower than the upper end of the plurality of first cylinders 31R and higher than the lower end of the plurality of first cylinders 31R (refer to FIG. 14). The water-resistant member 60 is disposed below the catalyst 57. The upstream sensor 58 is disposed above the catalyst 57, and the downstream sensor 59 is disposed at a height between the catalyst 57 and the water-resistant member 60. Tip end portions of the upstream sensor 58 and the downstream sensor 59 project inward from an inner surface of the first exhaust pipe 51.

Each of the upstream sensor 58 and the downstream sensor 59 are oxygen concentration sensors that detect an oxygen concentration in exhaust gases. Exhaust gases flowing in the exhaust passage 22 come into contact with the tip end portions of the upstream sensor 58 and the downstream sensor 59. The upstream sensor 58 detects an oxygen concentration in the exhaust gases before being purified by the catalyst 57, and the downstream sensor 59 detects an oxygen concentration in the exhaust gases after being purified by the catalyst 57. An air-fuel ratio of the air-fuel mixture to be supplied to the combustion chambers 42 is controlled by an engine control system based on detection values of the upstream sensor 58 and the downstream sensor 59, etc.

The exhaust opening 21 defined by the propeller 11 is disposed in the water, so that water enters the inside of the exhaust passage 22 through the exhaust opening 21. When the pressure inside of the combustion chambers 42 becomes negative (a pressure lower than the atmospheric pressure), water inside of the exhaust passage 22 may flow back in the exhaust passage 22 toward the combustion chambers 42. The water-resistant member 60 has a honeycomb shape that allows gases to pass through and blocks distribution of liquids. Therefore, even if water inside of the exhaust passage 22 reaches the water-resistant member 60, a back flow of the water is blocked by the water-resistant member 60. Accordingly, an amount of water that moves to a position farther upstream than the water-resistant member 60 is significantly reduced or prevented, and the catalyst 57, the upstream sensor 58, and the downstream sensor 59 are prevented from getting wet.

The tubular downstream end portion 51d of the first exhaust pipe 51 and the tubular upstream end portion 52u of the second exhaust pipe 52 are preferably joined by fitting. FIG. 5 shows an example in which the downstream end portion 51d of the first exhaust pipe 51 is inserted inside of the upstream end portion 52u of the second exhaust pipe 52. However, the upstream end portion 52u of the second exhaust pipe 52 may be inserted inside of the downstream end portion 51d of the first exhaust pipe 51. A gap between the first exhaust pipe 51 and the second exhaust pipe 52 is sealed by two O-rings R1 spaced from each other in the axial direction of the exhaust passage 22. Accordingly, exhaust gases are prevented from leaking from the gap between the first exhaust pipe 51 and the second exhaust pipe 52.

The cooling water passage 25 includes a first water passage 61 provided in the first exhaust pipe 51, a second water passage 62 provided in the second exhaust pipe 52, and two third water passages 63 provided in the two exhaust manifolds 50. As shown in an enlarged manner in FIG. 5, the first water passage 61 opens at the downstream end portion 51d of the first exhaust pipe 51, and the second water passage 62 opens at the upstream end portion 52u of the second exhaust pipe 52. The downstream end portion 51d of the first exhaust pipe 51 and the upstream end portion 52u of the second exhaust pipe 52 define an annular sealed space surrounding the exhaust passage 22 together with the two O-rings R1. The opening of the first water passage 61 and the opening of the second water passage 62 are disposed in this sealed space.

The first water passage 61 is connected to the second water passage 62 by a connecting portion between the first exhaust pipe 51 and the second exhaust pipe 52. The first water passage 61 is further connected to the third water passage 63 by a connecting portion between the first exhaust pipe 51 and the first exhaust manifold 50R and connected to the third water passage 63 by a connecting portion between the first exhaust pipe 51 and the second exhaust manifold 50L. Cooling water fed by the water pump 24 (refer to FIG. 1) flows from the second water passage 62 to the first water passage 61, and flows from the first water passage 61 to the third water passages 63. Therefore, a plurality of members including the first exhaust pipe 51 and the second exhaust pipe 52 are cooled by the same cooling water. In addition, while the cooling water is prevented from leaking by the two O-rings R1, the cooling water is distributed between the first water passage 61 and the second water passage 62.

FIG. 6 is a sectional view showing a vertical section of the exhaust passage 22 defined by the inner surface 51a of the first exhaust pipe 51. FIG. 7 is a sectional view showing a horizontal section of the first exhaust pipe 51, taken along line VII-VII in FIG. 6. In the following description, "upstream" means upstream in a flow direction of exhaust gases, and "downstream" means downstream in the flow direction of exhaust gases.

As shown in FIG. 6 and FIG. 7, the inner surface 51a of the first exhaust pipe 51 includes a tubular portion 51b extending in the up-down direction and a downward-facing portion 51c that closes an upper end of the tubular portion 51b. The upstream sensor 58 is inserted in a columnar upstream hole 1a that opens at the downward-facing portion 51c. The downstream sensor 59 is inserted in a columnar downstream hole 4a that opens at the tubular portion 51b.

As shown in FIG. 6, the downward-facing portion 51c defines two upstream projections 2a positioned around an outlet 1b of the upstream hole 1a, and a recess 3a positioned between the two upstream projections 2a. The tubular portion 51b includes two downstream projections 5a positioned around an outlet 4b of the downstream hole 4a, and a groove 6a positioned between the two downstream projections 5a.

The upstream projections 2a and the downstream projections 5a each are preferably integral and unitary with the inner surface 51a of the first exhaust pipe 51. The first exhaust pipe 51 is preferably molded by, for example, casting. The upstream projections 2a are positioned inside a circle that has a radius equal or substantially equal to a circumferential length (2×π×radius) of the rim of the outlet 1b of the upstream hole 1a and has a center located on a center of the outlet 1b of the upstream hole 1a. Similarly, the downstream projections 5a are positioned inside a circle that has a radius equal or substantially equal to the circumferential length of the rim of the outlet 4b of the downstream hole 4a and a center located on a center of the outlet 4b of the downstream hole 4a.

The first upstream collecting passage 67 and the second upstream collecting passage 65 that are portions of the exhaust passage 22 open at the downward-facing portion 51c, and are connected to the downstream collecting passage 68 by the downward-facing portion 51c. The upstream sensor 58, the upstream projections 2a, and the recess 3a are disposed in the downstream collecting passage 68. As shown in FIG. 7, a downstream end of the first upstream collecting passage 67 and a downstream end of the second upstream collecting passage 65 are positioned on both sides of the upstream sensor 58, the upstream projections 2a, and the recess 3a. The area of the recess 3a (the area of the portion surrounded by the rim 3b of the recess 3a) is smaller than the opening area of the first upstream collecting passage 67, and smaller than the opening area of the second upstream collecting passage 65. The rim 3b of the recess 3a may be circular, substantially circular, or may have a shape other than an exact circle, such as an oval shape. FIG. 7 shows an example in which the rim 3b of the recess 3a has a circular or substantially circular shape concentric with the outlet 1b of the upstream hole 1a.

Figure 8:
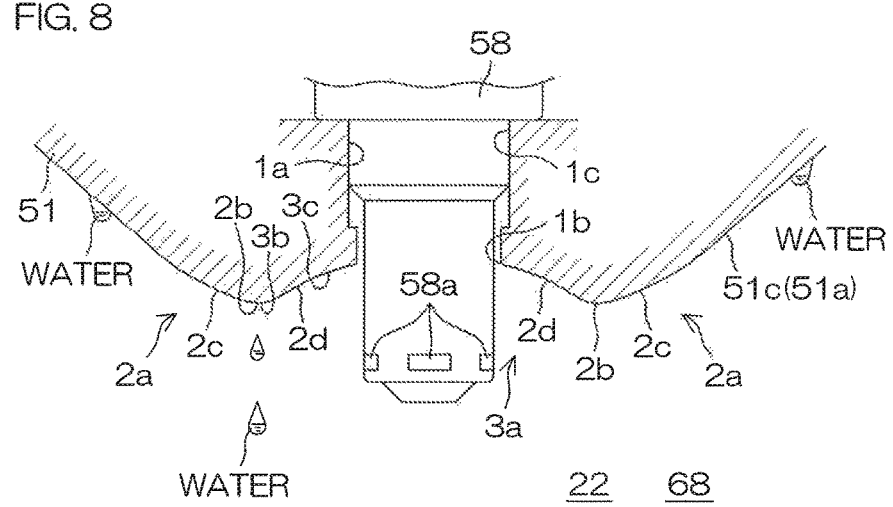
FIG. 8 is an enlarged view of a portion of FIG. 6, including an upstream sensor and upstream projections.
Figure 9:
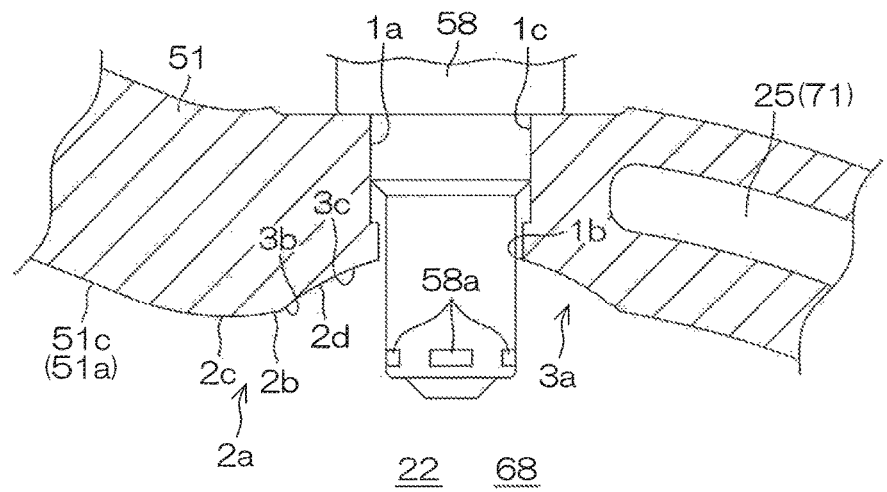
FIG. 9 is an enlarged view of a portion of FIG. 5, including the upstream sensor and the upstream projections.

FIG. 8 is an enlarged view of a portion of FIG. 6, including the upstream sensor 58 and the upstream projections 2a. FIG. 9 is an enlarged view of a portion of FIG. 5, including the upstream sensor 58 and the upstream projections 2a.

As shown in FIG. 8, the upstream hole 1a in which the upstream sensor 58 is inserted opens at the outer surface and the inner surface 51a of the first exhaust pipe 51. The inlet 1c of the upstream hole 1a is positioned above the outlet 1b of the upstream hole 1a. The upstream sensor 58 and the upstream hole 1a extend in the up-down direction. The outlet 1b of the upstream hole 1a is positioned in the recess 3a that is recessed upward. A tip end portion of the upstream sensor 58 projects from the outlet 1b of the upstream hole 1a to the inside of the exhaust passage 22. The tip end portion of the upstream sensor 58 is disposed below the upstream hole 1a. The upstream sensor 58 detects a state of exhaust gases that pass to the inside of the upstream sensor 58 from an introducing port 58a that opens at the tip end portion of the upstream sensor 58.

The recess 3a includes an annular rim 3b surrounding the upstream sensor 58 and an annular inner surface 3c extending obliquely upward and inward from the rim 3b of the recess 3a to the outlet 1b of the upstream hole 1a. The tip ends 2b of the upstream projections 2a correspond to portions of the rim 3b of the recess 3a, and downstream inclined surfaces 2d of the upstream projections 2a correspond to portions of the inner surface 3c of the recess 3a. The rim 3b and the inner surface 3c of the recess 3a surround the entire circumference of the upstream sensor 58. The rim 3b of the recess 3a is positioned at a height between the outlet 1b of the upstream hole 1a and the tip end portion of the upstream sensor 58. The inner surface 3c of the recess 3a is positioned at a height between the rim 3b of the recess 3a and the outlet 1b of the upstream hole 1a.

The two upstream projections 2a face each other in the horizontal direction. The upstream sensor 58 is positioned between the two upstream projections 2a. Each upstream projection 2a includes a tip end 2b positioned lower than the upstream hole 1a, an upstream inclined surface 2c extending obliquely downward and inward toward the tip end 2b, and a downstream inclined surface 2d extending obliquely downward and outward toward the tip end 2b. A tip end (lower end) of the upstream sensor 58 is disposed lower than the tip ends 2b of the upstream projections 2a. The height of the upstream projection 2a (the length in the vertical direction from the outlet 1b of the upstream hole 1a to the tip end 2b) is smaller than the diameter of the outlet 1b of the upstream hole 1a.

Figure 10:
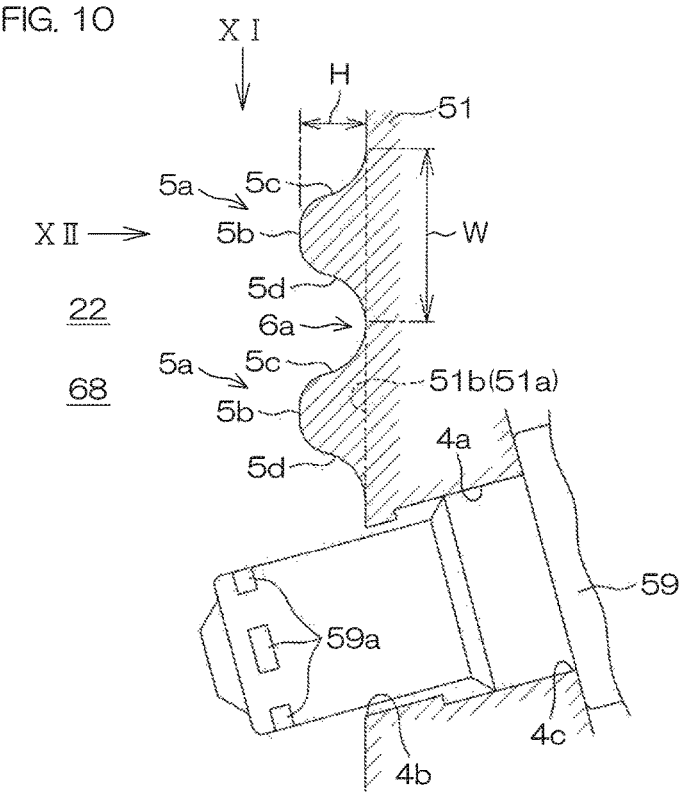
FIG. 10 is an enlarged view of a portion of FIG. 6, including a downstream sensor and downstream projections.
Figure 11:
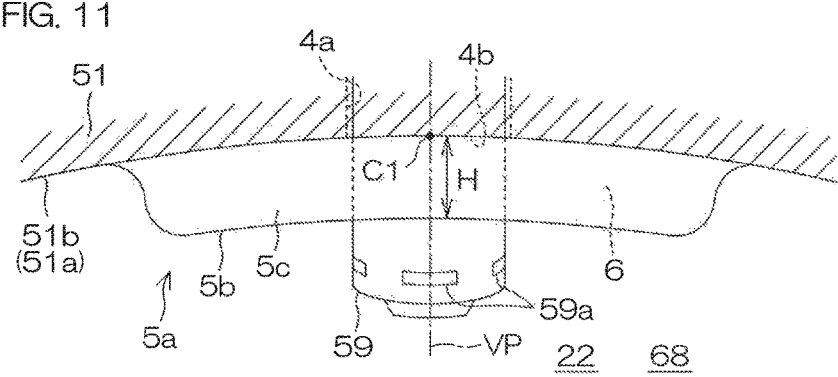
FIG. 11 is a view of the downstream sensor and the downstream projections in a vertical direction shown by an arrow XI in FIG. 10.
Figure 12:
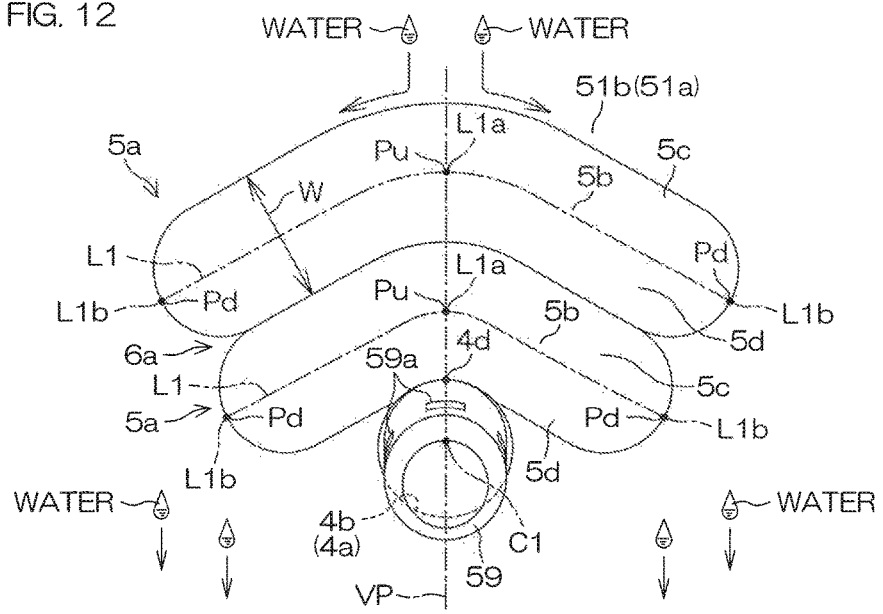
FIG. 12 is a view of the downstream sensor and the downstream projections in a horizontal direction shown by an arrow XII in FIG. 10.
Figure 13:
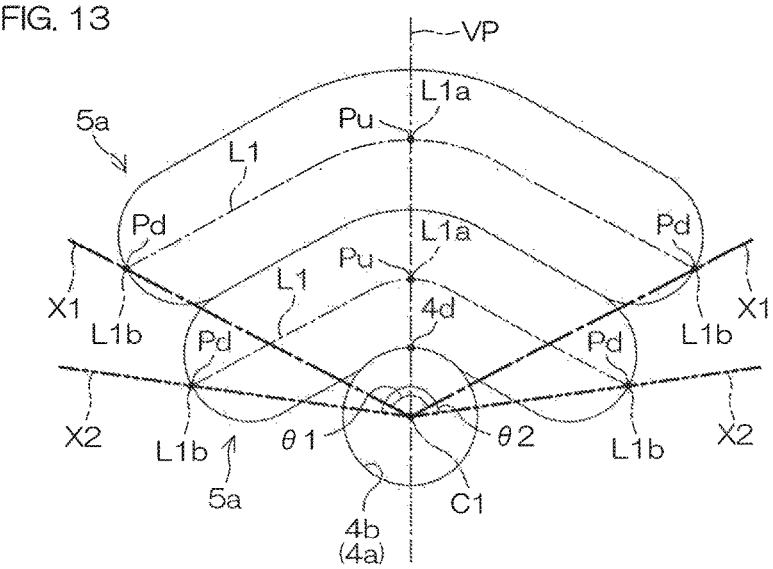
FIG. 13 is a view obtained by omitting the downstream sensor from FIG. 12.

FIG. 10 is an enlarged view of a portion of FIG. 6, including the downstream sensor 59 and the downstream projections 5a. FIG. 11 is a view of the downstream sensor 59 and the downstream projections 5a in the vertical direction shown by the arrow XI in FIG. 10. FIG. 12 is a view of the downstream sensor 59 and the downstream projections 5a in the horizontal direction shown by the arrow XII in FIG. 10. FIG. 13 is a view obtained by omitting the downstream sensor 59 from FIG. 12.

As shown in FIG. 10, the downstream hole 4a in which the downstream sensor 59 is inserted opens at the outer surface and the inner surface 51a of the first exhaust pipe 51. A portion of the inlet 4c of the downstream hole 4a is positioned at a height equal or substantially equal to the height of the outlet 4b of the downstream hole 4a. The downstream sensor 59 and the downstream hole 4a extend obliquely downward toward the centerline of the exhaust passage 22 (refer to FIG. 6). The downstream sensor 59 and the downstream hole 4a may extend horizontally, or may extend obliquely upward. The tip end portion of the downstream sensor 59 projects to the inside of the exhaust passage 22 from the outlet 4b of the downstream hole 4a. A portion of the outlet 4b of the downstream hole 4a is disposed at a height equal or substantially equal to the height of the tip end portion of the downstream sensor 59. The downstream sensor 59 detects a state of exhaust gases that pass into the inside of the downstream sensor 59 from an introducing port 59a that opens at the tip end portion of the downstream sensor 59.

As shown in FIG. 10, the two downstream projections 5a face each other in the vertical direction, and define a groove 6a opened inward between the two downstream projections 5a. The downstream sensor 59 is disposed below the two downstream projections 5a. As shown in FIG. 11, the downstream projections 5a overlap the downstream sensor 59 in a plan view. The downstream projections 5a preferably have curved shapes extending in the circumferential direction of the tubular portion 51b along the inner surface 51a of the first exhaust pipe 51. As shown in FIG. 12, the downstream projections 5a preferably have V-shaped configurations that open downward as viewed horizontally. The downstream projections 5a are preferably bilaterally symmetrical about a vertical plane VP that passes through the center C1 of the outlet 4b of the downstream hole 4a and bisects the outlet 4b of the downstream hole 4a. The center C1 of the outlet 4b of the downstream hole 4a is positioned on the vertical plane VP.

As shown in FIG. 10, each downstream projection 5a includes a tip end 5b disposed farther inside than the downstream hole 4a, an upstream inclined surface 5c extending obliquely downward and inward toward the tip end 5b, and a downstream inclined surface 5d extending obliquely upward and inward toward the tip end 5b. The tip end portion of the downstream sensor 59 is disposed farther inside than the tip ends 5b of the downstream projections 5a. The height H of the downstream projection 5a (the length in the horizontal direction from the outlet 4b of the downstream hole 4a to the tip end 5b) is smaller than the diameter of the outlet 4b of the downstream hole 4a. The height H of the downstream projection 5a is smaller than the width W of the downstream projection 5a, and smaller than the distance between the tip ends 5b of the two downstream projections 5a in the vertical direction. A circumferential length of the rim of the outlet 4b of the downstream hole 4a is larger than the width W of the downstream projection 5a and larger than the distance between two tip ends 5b in the vertical direction.

As shown in FIG. 12, the tip end 5b of the downstream projection 5a overlaps a centerline L1 that bisects the width W of the downstream projection 5a as viewed horizontally. The upstream inclined surface 5c and the downstream inclined surface 5d of the downstream projection 5a extend in the longitudinal direction (direction along the centerline L1) of the downstream projection 5a along the tip end 5b of the downstream projection 5a. The right end and the left end of the downstream projection 5a are positioned to the sides of the outlet 4b of the downstream hole 4a. As shown in FIG. 10, any portion of the outlet 4b of the downstream hole 4a is positioned below the downstream projections 5a.

The centerline L1 of each downstream projection 5a includes an upstream end L1a positioned at an upstream position Pu above the outlet 4b of the downstream hole 4a, and two downstream ends L1b positioned at two downstream positions Pd lower than the upstream position Pu and to the side of the outlet 4b of the downstream hole 4a, respectively. The centerline L1 of the downstream projection 5a further includes a right inclined portion extending obliquely downward and rightward from the upstream end L1a to the right downstream end L1b, and a left inclined portion extending obliquely downward and leftward from the upstream end L1a to the left downstream end L1b. The downstream ends L1b of the centerline L1 of the lower downstream projection 5a are positioned lower than the upstream end 4d of the outlet 4b of the downstream hole 4a.

As shown in FIG. 13, an angle θ1 between two straight lines X1 extending from the center C1 of the outlet 4b of the downstream hole 4a to the two downstream ends L1b of the centerline L1 of the upper downstream projection 5a is 120 degrees or more. Similarly, an angle θ2 between two straight lines X2 extending from the center C1 of the outlet 4b of the downstream hole 4a to the two downstream ends L1b of the centerline L1 of the lower downstream projection 5a is 120 degrees or more. Therefore, the downstream projections 5a protect the downstream sensor 59 from condensed water over a wide range. A shortest distance between the center C1 of the outlet 4b of the downstream hole 4a and the centerline L1 of the downstream projection 5a is shorter than the length of the centerline L1 of the downstream projection 5a along the longitudinal direction of the downstream projection 5a.

The water pump 24 (refer to FIG. 1) feeds low-temperature water around the outboard motor 6 to the first water passage 61 of the cooling water passage 25 provided in the first exhaust pipe 51. When the temperature of the inner surface 51a of the first exhaust pipe 51 drops to a temperature equal to or lower than the dew point, moisture contained in exhaust gases is condensed on the inner surface 51a of the first exhaust pipe 51, so that water (condensed water) attaches to the inner surface 51a of the first exhaust pipe 51. The condensed water flows downstream along the inner surface 51a of the first exhaust pipe 51 according to a flow of exhaust gases. The condensed water further flows downward along the inner surface 51a of the first exhaust pipe 51 due to gravity.

The upstream sensor 58 disposed upstream of the catalyst 57 (refer to FIG. 5) is inserted in the upstream hole 1a that opens at the downward-facing portion 51c of the inner surface 51a of the first exhaust pipe 51. As shown in FIG. 8, the condensed water flows downward on the upstream inclined surfaces 2c of the upstream projections 2a toward the tip ends 2b of the upstream projections 2a. The condensed water also flows downward on the downstream inclined surfaces 2d of the upstream projections 2a toward the tip ends 2b of the upstream projections 2a. Similarly, the condensed water flows downward on the inner surface 3c of the recess 3a toward the rim 3b of the recess 3a including the tip ends 2b of the upstream projections 2a. The condensed water runs down from the tip ends 2b of the upstream projections 2a. Therefore, condensed water hardly attaches to the upstream sensor 58, and the upstream sensor 58 hardly deteriorates.

The downstream sensor 59 disposed downstream of the catalyst 57 is inserted in the downstream hole 4a that opens at the tubular portion 51b of the inner surface 51a of the first exhaust pipe 51. As shown in FIG. 12, condensed water flowing on the tubular portion 51b toward the downstream sensor 59 tries to pass over the two downstream projections 5a projecting from the tubular portion 51b. The downstream projections 5a guide the condensed water downward and laterally to the sides while the condensed water tries to pass over the downstream projections 5a. The condensed water flowing along the downstream projections 5a runs down from both ends of the downstream projections 5a positioned to the side of the downstream sensor 59. Therefore, condensed water hardly attaches to the downstream sensor 59, and the downstream sensor 59 hardly deteriorates.

Figure 14:
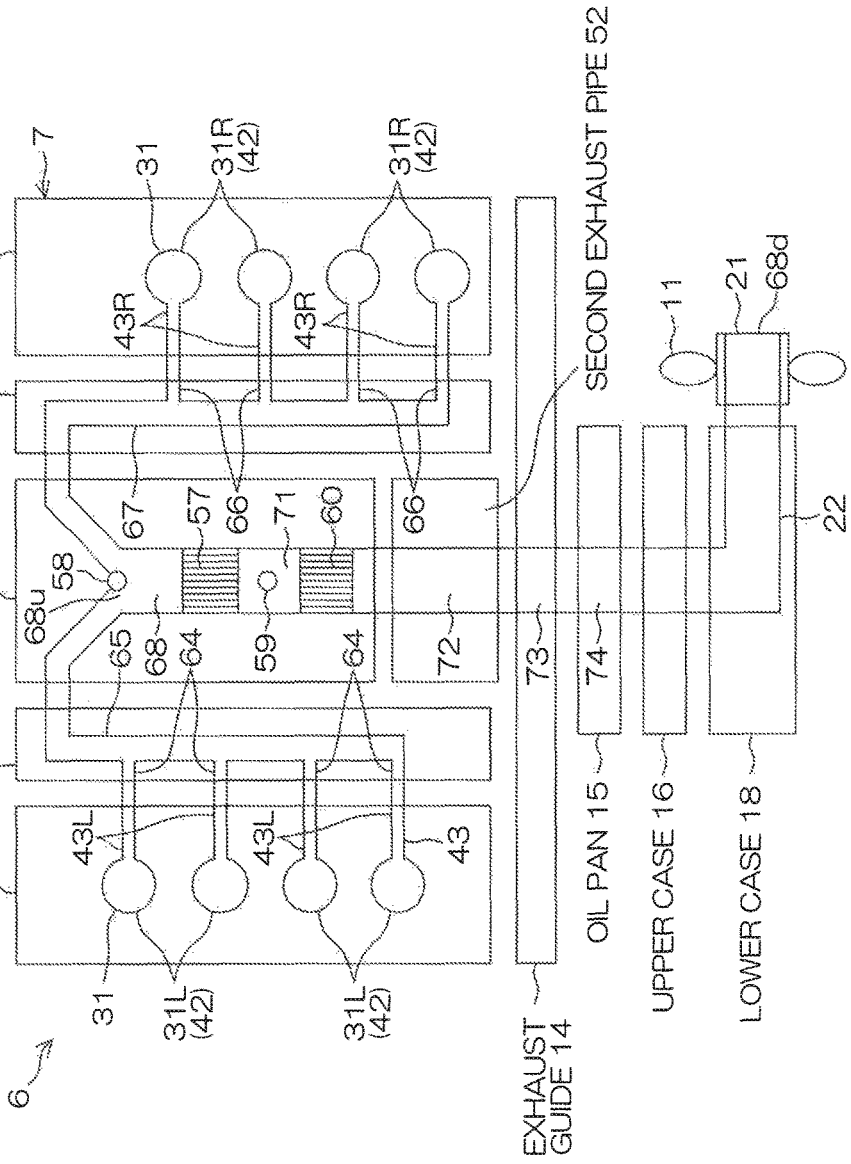
FIG. 14 is a conceptual diagram showing the entire exhaust passage.

FIG. 14 is a conceptual diagram showing the entire exhaust passage 22. Hereinafter, the exhaust passage 22 is described with reference to FIG. 5 and FIG. 14.

The exhaust passage 22 includes a plurality of branch passages 66 extending downstream from a plurality of first exhaust ports 43R corresponding to the plurality of first cylinders 31R, respectively, and a first upstream collecting passage 67 extending downstream from each of the first branch passages 66. Similarly, the exhaust passage 22 includes a plurality of second branch passages 64 extending downstream from a plurality of exhaust ports 43L corresponding to the plurality of second cylinders 31L, respectively, and a second upstream collecting passage 65 extending downstream from each of the second branch passages 64. The exhaust passage 22 further includes a downstream collecting passage 68 extending downstream from each of the first upstream collecting passage 67 and the second upstream collecting passage 65.

The first branch passages 66 are defined by the upstream branch portions 53 of the first exhaust manifold 50R. The second branch passages 64 are defined by the upstream branch portions 53 of the second exhaust manifold 50L. The plurality of first branch passages 66 join together inside of the first exhaust manifold 50R, and the plurality of second branch passages 64 join together inside of the second exhaust manifold 50L. The two exhaust manifolds 50 are disposed inside of the V-shaped line V1, so that the first branch passages 66 and the second branch passages 64 are positioned inside of the V-shaped line V1.

The first upstream collecting passage 67 includes the upstream collecting portion 54 of the first exhaust manifold 50R and one downstream branch portion 55 of the first exhaust pipe 51. The second upstream collecting passage 65 includes the upstream collecting portion 54 of the second exhaust manifold 50L and the other downstream branch portion 55 of the first exhaust pipe 51. The first upstream collecting passage 67 and the second upstream collecting passage 65 are positioned inside of the V-shaped line V1. The first upstream collecting passage 67 and the second upstream collecting passage 65 join together inside of the first exhaust pipe 51. The first upstream collecting passage 67 and the second upstream collecting passage 65 define a Y-shaped passage having a Y shape in a rear view of the exhaust passage 22 together with the downstream collecting passage 68.

The downstream collecting passage 68 extends from the junction of the first upstream collecting passage 67 and the second upstream collecting passage 65 to the exhaust opening 21 opened at the propeller 11 through the inside of the casing 13 including the exhaust guide 14 and the oil pan 15. The downstream collecting passage 68 includes a first passage 71 defined by the downstream collecting portion 56 of the first exhaust pipe 51, a second passage 72 defined by the second exhaust pipe 52, a third passage 73 defined by the exhaust guide 14, and a fourth passage 74 defined by the oil pan 15. The second passage 72 includes an approaching portion 75 (refer to FIG. 3) that extends toward the crankshaft 33 downstream in the flow direction of exhaust gases. The approaching portion 75 is disposed higher than the exhaust guide 14.

Exhaust gases generated in the two cylinder heads 37 are discharged to the two exhaust manifolds 50 disposed inside of the V-shaped line V1. Exhaust gases discharged to the two exhaust manifolds 50 flow inside of the first exhaust pipe 51 and are purified by the catalyst 57. The exhaust gases purified inside of the first exhaust pipe 51 pass through the second exhaust pipe 52, the exhaust guide 14, the oil pan 15, the upper case 16, and the lower case 18 in this order, and are discharged into the water from the propeller 11. Accordingly, exhaust gases generated in the plurality of cylinders 31 are discharged into the water.

As described above, in the present preferred embodiment, the inner surface 51a of the first exhaust pipe 51 defines the exhaust passage 22 that discharges exhaust gases generated in the combustion chambers 42. The upstream sensor 58 projects to the inside of the exhaust passage 22 from the upstream hole 1a provided in the inner surface 51a of the first exhaust pipe 51, and the downstream sensor 59 projects to the inside of the exhaust passage 22 from the downstream hole 4a provided in the inner surface 51a of the first exhaust pipe 51. Condensed water flows downstream along the inner surface 51a of the first exhaust pipe 51 according to a flow of the exhaust gases.

The upstream projections 2a projecting from the inner surface 51a of the first exhaust pipe 51 are positioned upstream of the outlet 1b of the upstream hole 1a in which the upstream sensor 58 is inserted, and the downstream projections 5a projecting from the inner surface 51a of the first exhaust pipe 51 are positioned upstream of the outlet 4b of the downstream hole 4a in which the downstream sensor 59 is inserted. Therefore, the flows of the condensed water toward the upstream sensor 58 and the downstream sensor 59 are blocked by the upstream projections 2a and the downstream projections 5a. Accordingly, the amounts of condensed water that reach the upstream sensor 58 and the downstream sensor 59 are reduced.

The upstream projections 2a cannot block the flow of condensed water toward the upstream sensor 58 between the outlet 1b of the upstream hole 1a and the upstream projections 2a. Similarly, the downstream projections 5a cannot block the flow of condensed water toward the downstream sensor 59 between the outlet 4b of the downstream hole 4a and the downstream projections 5a. In the present preferred embodiment, the upstream projections 2a and the downstream projections 5a are positioned near the upstream hole 1a and the downstream hole 4a, so that the amounts of condensed water generated between the outlets 1b and 4b and the projections 2a and 5a are reduced. Accordingly, the amounts of condensed water that reach the upstream sensor 58 and the downstream sensor 59 are reduced.

Further, in the present preferred embodiment, since the tip end of the upstream sensor 58 is not covered by the upstream projections 2a, the flow of exhaust gases toward the tip end of the upstream sensor 58 is hardly blocked by the upstream projections 2a. Similarly, since the tip end of the downstream sensor 59 is not covered by the downstream projections 5a, the flow of exhaust gases toward the tip end of the downstream sensor 59 is hardly blocked by the downstream projections 5a. Therefore, while the upstream sensor 58 and the downstream sensor 59 are prevented from getting wet, a state of exhaust gases flowing in the exhaust passage 22 is reliably detected by the upstream sensor 58 and the downstream sensor 59.

Further, in the present preferred embodiment, since the upstream projections 2a are positioned upstream of all portions of the outlet 1b of the upstream hole 1a, the flow of condensed water toward the upstream sensor 58 is blocked over a wide range. Similarly, since the downstream projections 5a are positioned upstream of all portions of the outlet 4b of the downstream hole 4a, the flow of condensed water toward the downstream sensor 59 is blocked over a wide range. Accordingly, the amounts of condensed water that reach the upstream sensor 58 and the downstream sensor 59 are further reduced.

Further, in the present preferred embodiment, since the upstream projections 2a and the downstream projections 5a are preferably integral and unitary with the inner surface 51a of the first exhaust pipe 51, work to attach the upstream projections 2a and the downstream projections 5a to the inner surface 51a of the first exhaust pipe 51 and work to fix the upstream projections 2a and the downstream projections 5a to the inner surface 51a of the first exhaust pipe 51 are unnecessary. Therefore, the process of manufacturing the engine 7 is simplified.

In the present preferred embodiment, the tip ends 2b of the upstream projections 2a are positioned lower than the outlet 1b of the upstream hole 1a. Condensed water generated on the inner surface 51a of the first exhaust pipe 51 flows downward on the inner surface 51a of the first exhaust pipe 51 due to gravity. If a portion extending downward toward the outlet 1b of the upstream hole 1a is present between the tip ends 2b of the upstream projections 2a and the rim of the outlet 1b of the upstream hole 1a, condensed water generated on this portion flows toward the upstream sensor 58. Therefore, by extending the portions from the tip ends 2b of the upstream projections 2a to the rim of the outlet 1b of the upstream hole 1a at a height between the tip ends 2b of the upstream projections 2a and the outlet 1b of the upstream hole 1a at any position, the amount of condensed water that flows toward the upstream sensor 58 is reduced.

Further, in the present preferred embodiment, the first upstream collecting passage 67 and the second upstream collecting passage 65 that are portions of the exhaust passage 22 open downward at the downward-facing portion 51c. Condensed water generated in these passages flows toward the downward-facing portion 51c due to gravity. Therefore, condensed water easily gathers at the downward-facing portion 51c. Therefore, by providing the upstream projections 2a around the upstream sensor 58 disposed in this environment, the upstream sensor 58 is effectively prevented from getting wet with condensed water.

In a case where the downstream projections 5a have annular shapes surrounding the entire circumference of the outlet 4b of the downstream hole 4a, condensed water may accumulate at the lower portions of the downstream projections 5a. In the present preferred embodiment, the downstream projections 5a open downward, so that such accumulation of condensed water is prevented. Further, the downstream projections 5a guide condensed water obliquely downward and laterally. Therefore, condensed water is kept to the side and away from the outlet 4b of the downstream hole 4a and the downstream sensor 59 by the downstream projections 5a. Accordingly, the amount of condensed water that reaches the downstream sensor 59 is reduced.

In a case where the outlet 4b of the downstream hole 4a from which the downstream sensor 59 projects is provided in a vertical surface of the tubular portion 51b, etc., condensed water flows toward the downstream sensor 59 due to gravity. In the present preferred embodiment, the downstream projections 5a are not only positioned upstream of the outlet 4b of the downstream hole 4a but also positioned higher than the outlet 4b of the downstream hole 4a. Therefore, the amount of condensed water that reaches the downstream sensor 59 is effectively reduced.

In the present preferred embodiment, condensed water reaching the downstream projections 5a is guided downstream along the downstream projections 5a extending from the upstream positions Pu upstream of the outlet 4b of the downstream hole 4a to the downstream positions Pd farther downstream than the upstream positions Pu. Since the downstream positions Pd are spaced to the sides of the outlet 4b of the downstream hole 4a, the downstream projections 5a guide condensed water to positions to the sides of the outlet 4b of the downstream hole 4a. No portion of the outlet 4b of the downstream hole 4a is positioned directly downstream of the downstream positions Pd, so that condensed water flowing downstream from the downstream positions Pd hardly reaches the downstream sensor 59. Therefore, the amount of condensed water that reaches the downstream sensor 59 is further reduced.

In the present preferred embodiment, the downstream projections 5a guide condensed water to positions (downstream positions Pd) that are spaced to the sides of the outlet 4b of the downstream hole 4a and farther downstream than the upstream end 4d of the outlet 4b of the downstream hole 4a. Therefore, even if condensed water flows in directions inclined toward the downstream sensor 59 from the downstream positions Pd, the condensed water hardly reaches the downstream sensor 59. Therefore, the amount of condensed water that reaches the downstream sensor 59 is further reduced.

In the present preferred embodiment, exhaust gases generated in any of the cylinders 31 are collected in the downstream collecting passage 68. The catalyst 57 that purifies exhaust gases is disposed in the downstream collecting passage 68. Therefore, exhaust gases generated in all cylinders 31 are treated with one catalyst 57. Further, the catalyst 57 is disposed inside of the V-shaped line V1, so that as compared with the case where the catalyst 57 is disposed outside of the V-shaped line V1, the widths of the engine 7 and the catalyst 57 are reduced.

In the present preferred embodiment, the downstream sensor 59 and the downstream projections 5a are provided downstream of the catalyst 57. Harmful substances (HC, CO, and NO$_x$ etc.) contained in exhaust gases are changed into water by the catalyst 57, so that when exhaust gases pass through the catalyst 57, the amount of moisture contained in the exhaust gases increases. Therefore, the downstream sensor 59 is disposed in an environment in which condensed water is easily generated. By providing the downstream projections 5a around the downstream sensor 59 disposed in this environment, the downstream sensor 59 is effectively prevented from getting wet with condensed water.

Although preferred embodiments of the present invention have been described above, the present invention is not restricted to the contents of the preferred embodiments and various modifications are possible within the scope of the present invention.

For example, the total number of cylinders 31 provided in the engine 7 is not limited to 8, and may be 6.

In the above-described preferred embodiments, a case where the oil pan 15 is preferably disposed above the upper case 16 is described. However, the oil pan 15 may be disposed inside of the upper case 16. In this case, the oil pan 15 may be integral and unitary with the upper case 16.

At least a portion of the exhaust manifold 50 may be integral and unitary with the cylinder head 37. For example, the plurality of upstream branch portions 53 of the exhaust manifold 50 may be integral and unitary with the cylinder head 37, and the upstream collecting portion 54 of the exhaust manifold 50 may be fixed to the cylinder head 37 by fixing members such as bolts.

The outboard motor 6 may include a plurality of catalysts 57. On the contrary, the outboard motor 6 may not include any catalysts 57. Similarly, the outboard motor 6 may not include the water-resistant member 60.

The exhaust sensor (the upstream sensor 58 and the downstream sensor 59) may be provided only upstream of the catalyst 57. The exhaust sensor is not limited to an oxygen concentration sensor, but may be a temperature sensor that detects a temperature of exhaust gases.

The catalyst 57 is not limited to being disposed inside of the V-shaped line V1, but may be disposed outside of the V-shaped line V1. The position of the catalyst 57 in the up-down direction is not limited to a position between the upper end of the plurality of first cylinders 31R and the lower end of the plurality of first cylinders 31R, but may be a position lower than the lower end of the plurality of first cylinders 31R.

The downstream collecting passage 68 may not include the approaching portion 75 that extends toward the crankshaft 33 downstream in the flow direction of exhaust gases. In detail, in a case where the exhaust guide 14 is disposed below the first exhaust pipe 51, the second exhaust pipe 52 may be a straight pipe extending from the first exhaust pipe 51 to the exhaust guide 14.

The first water passage 61 provided in the first exhaust pipe 51 and the second water passage 62 provided in the second exhaust pipe 52 may not be connected by the connecting portion between the first exhaust pipe 51 and the second exhaust pipe 52. In detail, two water supply channels to supply cooling water to the first water passage 61 and the second water passage 62, respectively, may be provided in the cooling water passage 25.

In the above-described preferred embodiments, the case where the second exhaust pipe 52 is preferably a member separate from the first exhaust pipe 51 and the exhaust guide 14 is described. However, at least a portion of the second exhaust pipe 52 may be integral and unitary with the exhaust guide 14.

In the above-described preferred embodiments, the case where the downstream collecting passage 68 preferably passes through the insides of the exhaust guide 14 and the oil pan 14 is described. However, the downstream collecting passage 68 may be disposed outside at least one of the exhaust guide 14 and the oil pan 15. For example, a portion from the upstream end 68u of the downstream collecting passage 68 to the downstream end 68d of the downstream collecting passage 68 may be disposed outside both of the exhaust guide 14 and the oil pan 15. With this arrangement, the downstream collecting passage 68 is arranged separately from the exhaust guide 14 and the oil pan 15.

In the above-described preferred embodiments, the case where the exhaust passage 22 preferably does not pass through the cylinder heads 37 and the cylinder body 36 in a region from the first exhaust pipe 51 to the exhaust guide 14 is described. However, the exhaust passage 22 may extend from the first exhaust pipe 51 to the exhaust guide 14 via the cylinder heads 37 and the cylinder body 36.

The number of upstream projections 2a may be 1 or 3 or more. The same applies to the downstream projections 5a.

Figure 15:
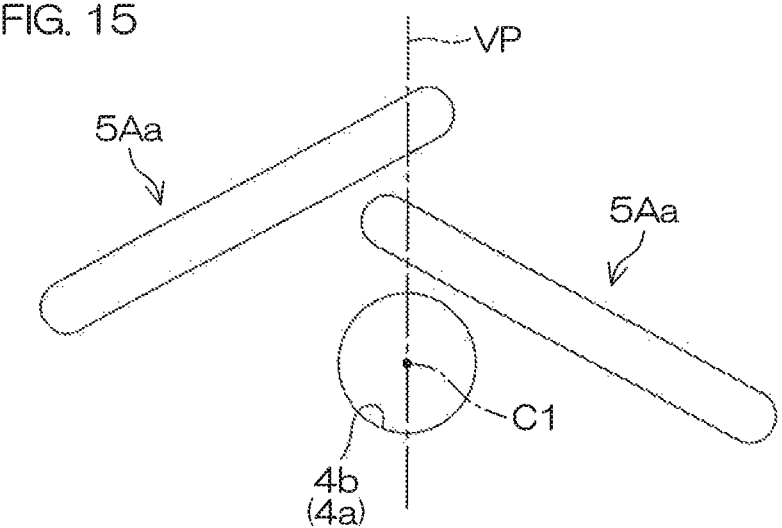
FIG. 15 is a horizontal view of downstream projections according to another preferred embodiment of the present invention.

The downstream projections 5a may be bilaterally symmetrical. FIG. 15 shows an example in which the upper downstream projection 5Aa has a linear shape extending obliquely leftward and downward, and the lower downstream projection 5Aa has a linear shape extending obliquely rightward and downward. A left end (downstream end) of the upper downstream projection 5Aa is positioned at a height between a left end (upstream end) of the lower downstream projection 5Aa and a right end (downstream end) of the lower downstream projection 5Aa.

Figure 16:
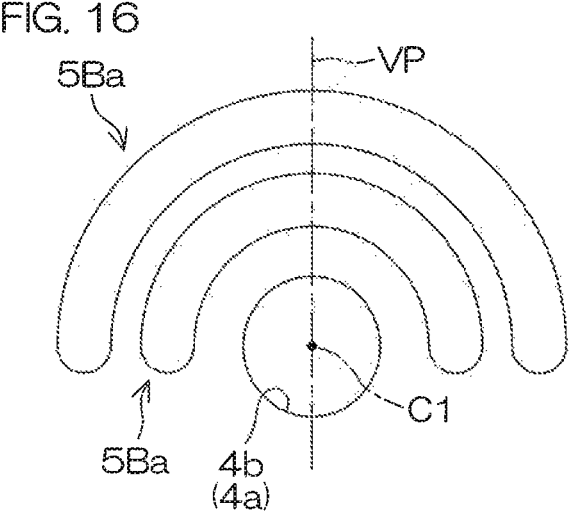
FIG. 16 is a horizontal view of downstream projections according to still another preferred embodiment of the present invention.

The downstream projections 5a may have arc shapes or U shapes that open downward. FIG. 16 shows an example in which downstream projections 5Ba have arc shapes having central angles of 180 degrees or less. In this case, the downstream projections 5Ba may have arc shapes concentric with the outlet 4b of the downstream hole 4a.

In the above-described preferred embodiments, the case where the tip ends 2b of the upstream projections 2a and the tip ends 5b of the downstream projections 5a preferably have arc-shaped sections is described. However, the sections of the tip ends 2b of the upstream projections 2a may have linear shapes. The same applies to the downstream projections 5a.

The upstream projections 2a may surround the entire circumference of the outlet 1b of the upstream hole 1a. Similarly, the downstream projections 5a may surround the entire circumference of the outlet 4b of the downstream hole 4a.

In the above-described preferred embodiments, the case where all portions of the outlet 1b of the upstream hole 1a are positioned downstream of the upstream projections 2a, and all portions of the outlet 4b of the downstream hole 4a are positioned downstream of the downstream projections 5a is described. However, a portion of the outlet 1b of the upstream hole 1a may be positioned downstream of the upstream projections 2a, and the remaining port ion of the outlet 1b of the upstream hole 1a may be positioned to the sides of the upstream projections 2a. The same applies to the downstream hole 4a.

In the above-described preferred embodiments, the case where the present invention is applied to an engine for an outboard motor is described. However, the present invention may be applied to an engine for a vessel propulsion apparatus other than an outboard motor, and may be applied to an engine for a land vehicle. The engine is not limited to a V-type engine, and may be other types of engines such as an inline engine.

Also, features of two or more of the various preferred embodiments described above may be combined.

The present application claims priority to Japanese Patent Application No. 2015-053697 filed on Mar. 17, 2015 in the Japan Patent Office, and the entire disclosure of this application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An engine comprising: a cylinder head defining a combustion chamber;
   an exhaust pipe defining an exhaust passage that discharges exhaust gases generated in the combustion chamber;
   a cooling water passage that guides cooling water to cool the exhaust pipe; an exhaust sensor projecting from an opening provided in an inner surface of the exhaust pipe to an inside of the exhaust passage; and
   a projection provided in the inner surface of the exhaust pipe along the opening in which the exhaust sensor is inserted, and positioned farther inside the exhaust passage than the opening; wherein
   at least a portion of the projection is positioned upstream of the opening in a flow direction of exhaust gases;
   the exhaust sensor includes an introduction port that introduces exhaust gases into the exhaust sensor;
   the introduction port is positioned farther inside the exhaust passage than the projection; and
   a portion of the inner surface of the exhaust pipe from a tip end of the projection to a rim of the opening is positioned at a height between the tip end of the projection and the opening at any position.

2. The engine according to claim 1, wherein a shortest distance between the opening and the projection is smaller than a circumferential length of a rim of the opening.

3. The engine according to claim 1, wherein any portion of the opening is positioned downstream of the projection.

4. The engine according to claim 1, wherein the projection is integral and unitary with the inner surface of the exhaust pipe.

5. The engine according to claim 1, further comprising:
   a catalyst disposed in the exhaust passage; wherein
   the exhaust sensor and the projection are each provided at least one of upstream and downstream of the catalyst.

6. The engine according to claim 5, wherein the exhaust sensor and the projection are each provided upstream of the catalyst, and another exhaust sensor and another projection are each provided downstream of the catalyst.

7. The engine according to claim 1, wherein the tip end of the projection is positioned farther inside the exhaust passage than the opening.

8. The engine according to claim 7, wherein the inner surface of the exhaust pipe includes a downward-facing portion at which a plurality of passages that guide exhaust gases open; and
   the opening and the projection are provided at the downward-facing portion.

9. The engine according to claim 1, wherein at least a portion of the projection is positioned higher than the opening and the exhaust sensor.

10. The engine according to claim 1, wherein the projection extends from an upstream position upstream of the opening to a downstream position that is farther downstream than the upstream position and laterally of the opening.

11. The engine according to claim 10, wherein the downstream position is farther downstream than an upstream end of the opening.

12. The engine according to claim 1, wherein an angle between two straight lines that connect a center of the opening and both ends of the projection is 60 degrees or more.

13. The engine according to claim 12, wherein the angle between the two straight lines that connect the center of the opening and the both ends of the projection is 120 degrees or more.

14. The engine according to claim 1, wherein the projection has a V-shaped or arc-shaped configuration which opens downward.

15. The engine according to claim 14, wherein the projection has an arc-shaped configuration concentric with the opening.

16. An outboard motor comprising:
the engine according to claim 1; and
a water pump that feeds water outside of the outboard motor to the cooling water passage of the engine.

17. An engine comprising:
a cylinder head defining a combustion chamber;
an exhaust pipe defining an exhaust passage that discharges exhaust gases generated in the combustion chamber;
a cooling water passage that guides cooling water to cool the exhaust pipe;
an exhaust sensor projecting from an opening provided in an inner surface of the exhaust pipe to an inside of the exhaust passage; and
projections provided in the inner surface of the exhaust pipe along the opening in which the exhaust sensor is inserted, and positioned farther inside the exhaust passage than the opening; wherein
at least a portion of each of the projections is positioned upstream of the opening in a flow direction of exhaust gases;
the exhaust sensor includes an introduction port that introduces exhaust gases into the exhaust sensor; and
the introduction port is positioned farther inside the exhaust passage than the projections.

* * * * *